(12) United States Patent
Yang et al.

(10) Patent No.: US 9,064,461 B2
(45) Date of Patent: Jun. 23, 2015

(54) LOAD-AWARE COMPENSATION IN LIGHT-EMITTING-DIODE BACKLIGHT ILLUMINATION SYSTEMS

(71) Applicant: Atmel Corporation, San Jose, CA (US)

(72) Inventors: Zhiyu Yang, Cupertino, CA (US); Kien Vi, San Jose, CA (US); Dilip Sangam, Saratoga, CA (US); Tushar Dhayagude, Santa Clara, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

(21) Appl. No.: 14/076,899

(22) Filed: Nov. 11, 2013

(65) Prior Publication Data

US 2014/0139126 A1    May 22, 2014

Related U.S. Application Data

(63) Continuation of application No. 12/772,067, filed on Apr. 30, 2010, now Pat. No. 8,581,828.

(51) Int. Cl.
*G09G 3/34* (2006.01)
*H05B 33/08* (2006.01)

(52) U.S. Cl.
CPC ............. *G09G 3/342* (2013.01); *G09G 3/3406* (2013.01); *G09G 2320/064* (2013.01); *H05B 33/0818* (2013.01); *H05B 33/0827* (2013.01); *H05B 33/0851* (2013.01); *Y02B 20/346* (2013.01)

(58) Field of Classification Search
USPC ........................................................ 345/102
See application file for complete search history.

(56) References Cited

U.S. PATENT DOCUMENTS

| | | | |
|---|---|---|---|
| 7,847,491 B2 | 12/2010 | Lin et al. | |
| 7,944,263 B2 | 5/2011 | Suda | |
| 7,948,468 B2* | 5/2011 | Zane et al. | 345/102 |
| 8,054,283 B2 | 11/2011 | Lee et al. | |

OTHER PUBLICATIONS

Erickson, et al. Fundamentals of Power Electronics, Second edition. Last accessed Apr. 22, 2010, 36 pages.
Doshi, et al. Digital Architecture for Driving Large LED Arrays with Dynamic Bus Voltage Regulation and Phase Shifted PWM. Last accessed Apr. 21, 2010, 7 pages.

* cited by examiner

*Primary Examiner* — Robin Mishler
(74) *Attorney, Agent, or Firm* — Fish & Richardson P.C.

(57) ABSTRACT

System(s) and method(s) are provided for power management in an electronic display via compensation of a power source of a light-emitting-diode (LED) backlighting system. A compensation feedback loop includes a load-aware controller that receives the bad condition from a dimming controller and supplies a control signal to the power source. An efficiency regulator functionally connected the backlight circuitry closes the compensation, feedback loop and provides an input signal to the load-aware controller. The dimming controller implements phase-shifted pulse-modulation dimming, which based on duty cycle can establish a dimming equilibrium with two load conditions. The load aware controller includes a set of compensation blocks arranged in parallel, with a single compensation block connected to the input signal and that provides the control signal. A selector component in the load aware controller determines a compensation block to be connected to the compensation feedback loop based on the received load condition.

19 Claims, 10 Drawing Sheets

LOAD-AWARE COMPENSATION IN LIGHT-EMITTING-DIODE BACKLIGHT ILLUMINATION SYSTEMS

TECHNICAL FIELD

The subject disclosure relates to illumination systems that include light-emitting-diode (LED) technology and, more specifically, to power management via compensation of a power source of an LED backlighting system, the compensation based on load conditions) of the LED backlighting system.

BACKGROUND

Backlights are used to illuminate liquid crystal displays (LCDs). LCDs with backlights are used in small displays for mobile phones, personal digital assistants (PDAs), portable computers, as well as in large displays for computer monitors and televisions. Often, the light source for the backlight includes one or more cold cathode fluorescent lamps (CCFLs). The light source for the backlight can also be an incandescent light bulb, an electroluminescent panel (ELP), or one or more hot cathode fluorescent lamps (HCFLs).

As costs of light emitting diodes (LEDs) are reduced and their quality is improved, the display industry is enthusiastically pursuing the use of light emitting diodes (LEDs) as the light source in backlight display technology because CCFLs have many shortcomings: For instance, CCFLs do not easily ignite in cold temperatures, they require adequate idle time to ignite, and they require delicate handling. In addition, LEDs have response times substantially faster than CCFLs. Moreover, the color gamut afforded by LEDs is wider than other light sources employed for backlighting and thus provide more vivid color. Furthermore, LEDs generally have a higher ratio of light generated to power consumed than other backlight sources. Accordingly, displays with LED backlights can consume less power than other displays, which renders LED-based displays more sustainable. LED backlighting has traditionally been used in small, inexpensive LCD panels. However, LED backlighting is becoming more common in large displays such as those installed in computers and television sets. In large LCD displays, several LEDs are generally required to provide adequate backlight for the LCD panel; based on specifics of the display, the number of LEDs can reach several hundreds.

In LCD displays that utilize a substantive number of LEDs for backlighting, power management is typically accomplished through pulse-width modulation (PWM) of power applied to the LEDs, also commonly referred to PWM dimming. Conventional LCD displays that, exploit PWM dimming in installed LED-based backlighting systems generally are unable to implement phase-shifted PWM dimming, which typically causes electromagnetic interference in various portions of the LED-based backlighting system. In addition, conventional LCD displays that can implement phase-shifted PWM dimming generally present perceived quality of operation issues; for instance, audible noise arising from response of one or more electronic elements in the LCD display to variations in operation conditions of the LED-based backlighting system due to PWM dimming. Accordingly, power efficiency of LED-based backlighting systems can be improved.

SUMMARY

The following presents a simplified summary of the subject disclosure in order to provide a basic understanding of some aspects thereof. This summary is not an extensive overview of the various embodiments of the subject disclosure. It is intended to neither identify key or critical, elements nor delineate any scope. Its sole purpose is to present some concepts in a simplified form as a prelude to the more detailed description that is presented later.

One or more embodiments of the subject disclosure provide system(s) and method(s) for power management in an electronic display via compensation of a power source of a LED-based backlighting system based on load conditions. The LED-based backlighting system includes backlight circuitry comprising a set of LED arrays configured in strings of one or more LEDs. A compensation feedback loop includes a load-aware controller that acquires (receives, retrieves, etc.) the load condition (e.g., a load metric, or load metric value) from a dimming controller and supplies a control signal to a power source. An efficiency regulator component functionally connected to the backlight circuitry completes the feedback loop, or feedback circuit, and provides an input signal to the load-aware controller. The dimming controller implements phase-shifted PWM dimming, which based at least on the duty cycle of the PWM dimming profile can establish a dimming equilibrium state with at least two load conditions. The load aware controller can include at least two compensation blocks arranged or connected in parallel, with a single compensation block connected to the input signal and that provides the control signal as output. Based on the received load condition, a selector component in the load aware controller determines a compensation block to be connected to the compensation feedback loop; the determination can be based on historical values of load condition. Architecture of load-aware controller is general and extensible; in particular, though not exclusively, in digital implementation of compensation block(s) for which a digital filter with at least one pole can be configured as a result of equilibrating operation of the LED-based backlighting system for a new load condition.

When compared to conventional power management systems in LED-based backlighting systems, the system(s) and method(s) of the subject disclosure provide at least the following advantages: (i) enable reduction of a voltage applied to backlight circuitry while ensuring that current supplied to the a set of LEDs is regulated; and (ii) enable PWM dimming without generation of electromagnetic interference or audible noises caused by form fluctuation in capacitive element(s) in LED-based backlighting systems.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
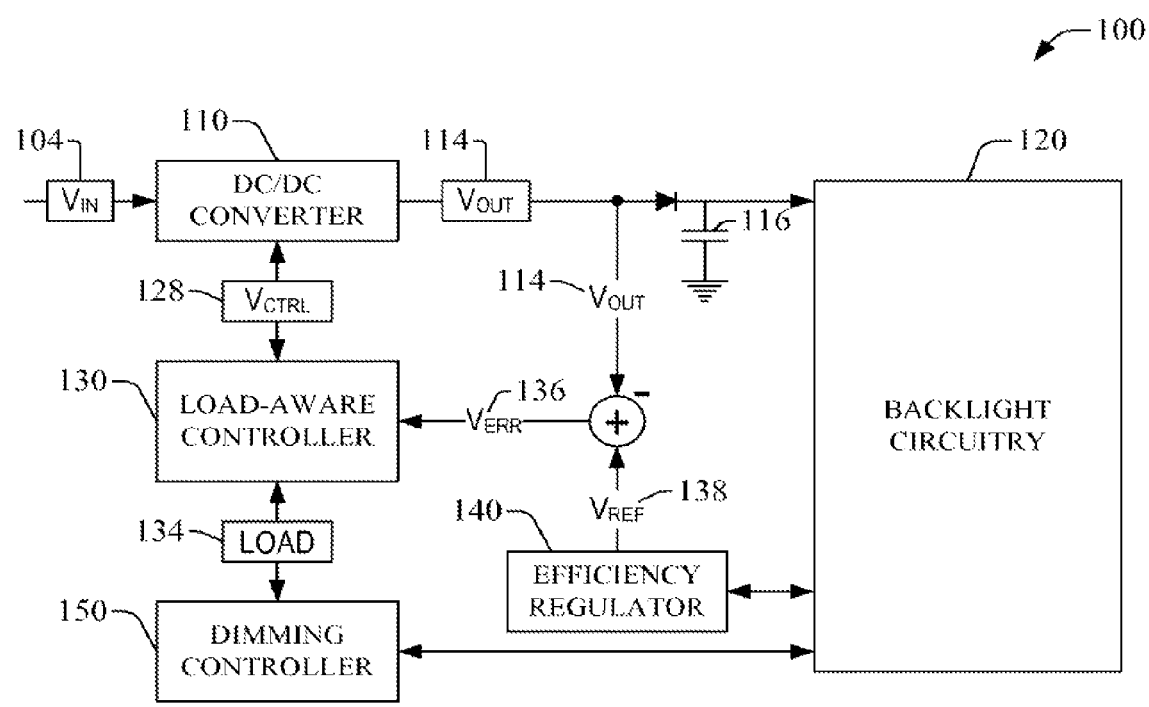
FIG. 1 is a block diagram of an example backlighting system that enables and exploits load-aware power management in accordance with one or more aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the present disclosure. It may be evident, however, that the various embodiments of the subject disclosure may be practiced without these specific details. In other instances, well-known structures and devices are shown in block diagram form in order to facilitate describing the present disclosure.

As employed in this specification and annexed drawings, the terms "component," "system," "block," "interface," "controller," and the like are intended to include a computer-related entity or an entity related to an operational apparatus with one or more specific functionalities, wherein the entity can be either hardware, a combination of hardware and software, software, or software in execution. One or more of such entities are also referred to as "functional elements." As an example, a component may be, but is not limited to being a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, block, interface, controller, and the like.

In addition, the term "or" is intended to mean an inclusive "or" rather than, an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of LED strings includes one or more LED strings; a set of parameters includes one or more parameters; etc.

Various aspects or features will be presented in terms of systems that may include a number of devices, components, blocks, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 is a block diagram of an example backlighting system 100 that enables and exploits load-aware power management in accordance with one or more aspects of the subject disclosure. Example backlighting system 100 can be part of a display system (e.g., an LCD panel), wherein a system power bus (not shown) that energizes the display system supplies input voltage $V_{in}$ 104 is to DC/DC converter 110, which provides $V_{out}$ 114 to supply power to backlight circuitry 120; a system power bus (not shown) typically supplies $V_{in}$ 104. The DC/DC converter 110 is a power source and is also referred to booster converter; the DC/DC converter 110 includes circuitry that supplies power (e.g., an output voltage). Backlight circuitry 120 includes a group of light-emitting-diode (LED) and related circuitry (driver circuitry, controllers, sense resistors, capacitors, connectors, etc.). In response to load variations in backlight circuitry 120, the magnitude of $V_{out}$ 114 can be compensated based at least on control signal $V_{ctrl}$ 128; compensation is directed to lowering $V_{out}$ 114 while retaining operation of backlight circuitry 120 at a satisfactory condition, e.g., optimal condition or nearly optimal condition. Such, lowering of $V_{out}$ 114 is referred to herein as voltage optimization (VO).

In example backlighting system 100, in an aspect of the subject disclosure, compensation feedback loop for $V_{out}$ 114 includes load-aware controller 130, which acquires (receives, retrieves, etc.) a load metric 134 and supplies control signal $V_{ctrl}$ 128 based at least on one or more of the load metric 134 or $V_{err}$ 136. The compensation (comp.) feedback loop, or circuit, is closed through efficiency regulator component 140, also referred to as efficiency regulator 140, via an input signal $V_{err}$ 136 (e.g., an offset voltage) supplied to load-aware controller 130. In an aspect, in response to the load variations in backlight circuitry 120, efficiency regulator 140 generates the input signal $V_{err}$ 136 (e.g., an offset voltage), wherein the offset is valued with respect to a current or nearly current value of $V_{out}$ 114 that energizes or drives backlight circuitry 120. Magnitude of $V_{err}$ 136 results from the subtraction of $V_{out}$ 114 from $V_{ref}$ 138; namely, $V_{err}=V_{ref}-V_{out}$. The magnitude of $V_{ref}$ 138 is established by efficiency regulator 140, as described hereinafter. As illustrated, an adder node enables the subtraction operation and provides $V_{err}$ 136 to load-aware controller 130 to close the compensation or regulation feedback loop.

Figure 2:
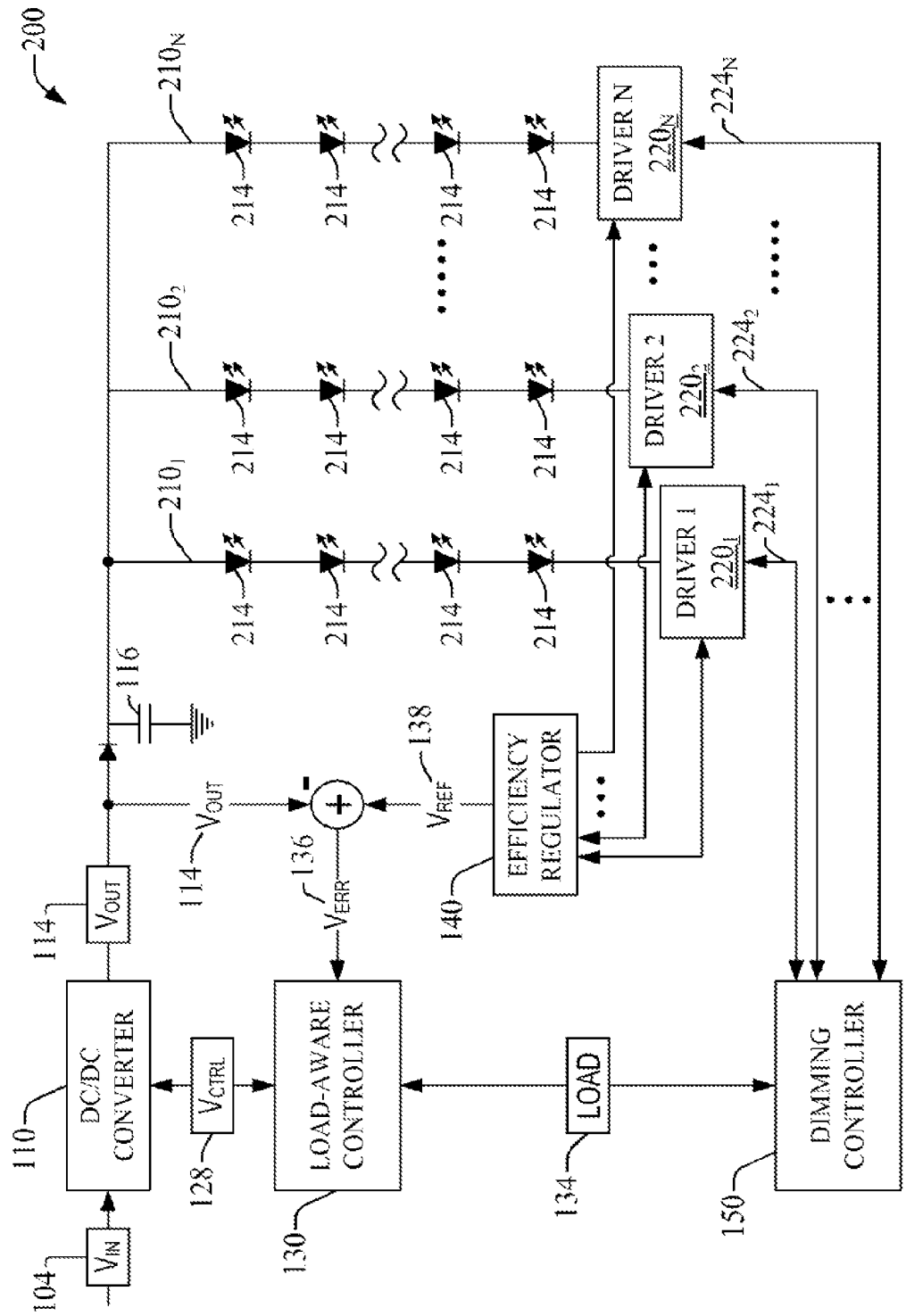
FIG. 2 represents an example embodiment of backlight circuitry that can be part of the backlighting system, displayed in FIG. 1 in accordance with aspects described herein.

In example backlighting system 100, load-aware controller can receive or retrieve load 134 from dimming controller 150, which can implement dimming of backlight circuitry 120 through pulse-width modulation (PWM) of power supplied thereto. In an aspect, PWM dimming is implemented while peak current is maintained constant to mitigate or prevent white point shift. Load 134 can be time-dependent and can depend, at least in part, on PWM dimming implementation as described hereinafter. Load 134 can be represented by a load metric, or load metric value, and thus is also referred to herein as load metric 134. As described herein, and in contrast to conventional backlighting systems, load-aware regulation of $V_{out}$ 114 mitigates variations thereof with the ensuing avoidance of audible noises that can originate from form fluctuation of capacitive element(s), capacitor 116, in the output stage of power or voltage supply to backlight circuitry Topology of LEDs in backlight circuitry 120 also can determine, at least in part, aspects of PWM dimming implementation. In one or more embodiments, such as example embodiment 200 presented in FIG. 2, backlight circuitry 120 comprises a set of N strings $210_1$-$210_N$ of light emitting diodes (LEDs) 214 distributed throughout an electronic display area (not shown); here, N is a natural number equal to or greater than unity. One or more LED strings in a set of LED strings can be controlled by a constant current driver circuit, or driver, which can apply voltage or supply current. As illustrated, LED strings $210_1$-$210_N$ are connected in parallel and each string includes a driver $220_\kappa$, which is connected in series with the string $210_\kappa$; in various operational scenarios, driver $220_\kappa$ connects its string $210_\kappa$ to an electrical ground. In the set of strings $210_1$-$210_N$, one or more strings of LEDs include either red (R), blue (B), or green (G) LEDs. Each string $210_\kappa$, with $\kappa=1, 2 \ldots N$, in the set of N strings of LEDs is illustrated as a linear chain including one or more LEDs connected in series by wires, traces or other connecting elements. While in example embodiment 200 the linear chain of LEDs is arranged vertically, other arrangements of strings with LEDs in each string discretely scattered across the electronic display area are also possible. Moreover, LED strings can be mutually parallel or can be deployed in other relative orientations. To implement PWM dimming, dimming controller 150 is functionally coupled to drivers $220_1$-$220_N$ and selectively turns on and off each LED string $210_\kappa$ according to a time waveform, or profile, specific to each LED string $210_\kappa$. In an aspect, load 134 can be assessed as the number of active LEDs multiplied by the current circulating through the active strings—in one or more embodiments, dimming controller 150 includes a load assessment component (not shown) that assesses the load 134.

In particular, though not exclusively, PWM dimming in example backlighting system 100 can be phase-shifted PWM dimming, wherein each LED string is turned on and off periodically according to a single predetermined frequency ($f$) and a single predetermined duty cycle (D) but out-of-phase relative to disparate strings, with a phase shift equal to $M\times\phi$, where M is a finite, integer (mod N) index that characterizes separation amongst strings—M=±1 nearest neighbor strings, M=±2 second nearest neighbor strings, and so forth. A positive value of M indicates an LED string power onset is delayed with respect to its neighbor, whereas a negative value of M indicates the LED string power onset is advanced with respect to its neighbor. In one or more embodiments, dimming controller 150 can include a timing signal generator (not shown) that provides clock signals that determine the PWM dimming waveform, and thus the frequency $f$. In addition, dimming controller 150 can include a phase signal generator component (not shown), which produces one or more values of phase $\phi$; one or more phase delay register(s) that can be part of a memory within the dimming controller 150 or functionally coupled thereto.

Dimming controller 150 can include a processor that provides at least part of its functionality, or the functionality of one or more components therein, such as timing signal generator (not shown) or phase signal generator component (not shown). In an aspect the processor can execute one or more sets of code instructions retained in the memory that can reside within dimming controller 150 or that can be functionally coupled thereto. In certain embodiments, dimming controller 150 also can include one or more I/O interfaces. In additional or alternative embodiments, dimming controller 150 also can be implemented as a set of computer-executable code instructions retained in a memory and executed by one or more processors.

Figure 3:
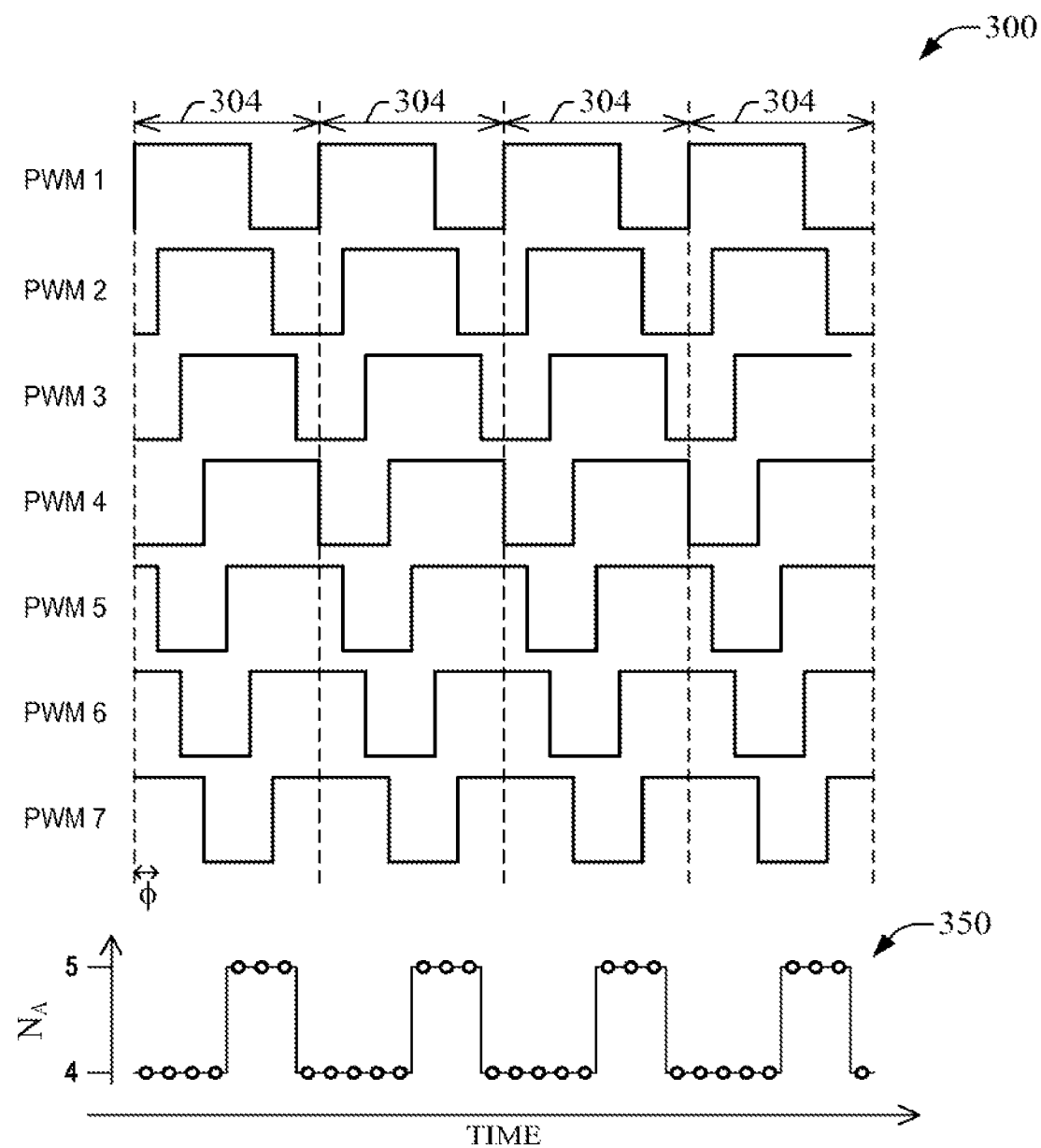
FIG. 3 illustrates example phase-shifted PWM dimming for an illustrative set of strings of LEDs in accordance with aspects of the subject disclosure.

Diagram 300 in FIG. 3 illustrates phase-shifted PWM dimming for N=7 strings of LEDs through a time span of four PWM frames 304, each of which spans an interval $1/f$. Each string is turned on and off in accordance with a PWM waveform or time sequence. Illustrated duty cycle is D=5/8 and $\phi=1/(8f)$. In an aspect of phase-shifted PWM dimming, the number of active strings of LEDs toggles between the two integers that are nearest to the average number of active LED strings. For a PWM duty cycle D, the number of active strings can adopt at most two possible values: floor(DN) and ceil(DN); here, floor(x) evaluates to the largest integer less than or equal to the argument x and ceil(x) is the smallest integer greater than or equal to x; wherein x is a real number. For a duty cycle D that is commensurate with the number N of LED strings in the set of strings of LEDs, e.g., D=p/N, with p a positive integer, the foregoing values of active strings become degenerate, e.g., equal, since dimming controller 150 can drive the backlight circuitry 120, embodied in the set of strings $210_1$-$210_N$, into an equilibrium condition in which an integer number of strings, e.g., p, is active at all times. Diagram 350 presents the number of active strings $N_A$ as a function of time for the illustrated PWM waveforms, or time sequences; open circles in diagram represent discrete values obtained for NA for a time discretization in $1/(8f)$ intervals. As indicated supra, $N_A$ fluctuates from 4=floor(35/8) to 5=ceil(35/8), which are different since D=5/8 is not commensurate with N=7; in alternative terms, dimming controller can only achieve an equilibrium condition in which the backlight circuitry 120, embodied in the set of strings $210_1$-$210_N$, fluctuates between operation in 4 active strings of LEDs and 5 active strings of LEDs.

It should be appreciated that phase-shifted PWM dimming has advantages over PWM dimming in the absence of phase shift, e.g., $\phi=0$. In the latter mode of power dimming, all LED strings $210_1$-$210_N$ are simultaneously turned on and turned off; such PWM dimming is termed herein simultaneous PWM. In such scenario, at a time the LED strings $210_1$-$210_N$ are on, the DC/DC converter 110 is on and drains full power from the system power bus to supply the voltage $V_{out}$ 114 to the group of LEDs that, are part of the set of strings $210_1$-

$210_N$. Simultaneous PWM can cause electromagnetic interference (EMI) to other parts of a backlighting system, particularly, but not exclusively, blocks on the system power bus (not shown), because of the periodic draining of power effected at the simultaneous PWM frequency ($f_s$). Harmonic frequency(ies) of $f_s$ also can cause EMI. In contrast to simultaneous PWM, phase-shifted PWM dimming leads to the DC/DC converter 110 to drain power from the system power bus continuously or substantially continuously, extracting an average power; accordingly, phase-shifted PWM dimming mitigates generation of EMI from the backlighting system 100 onto the system power bus (not shown).

Figure 4:
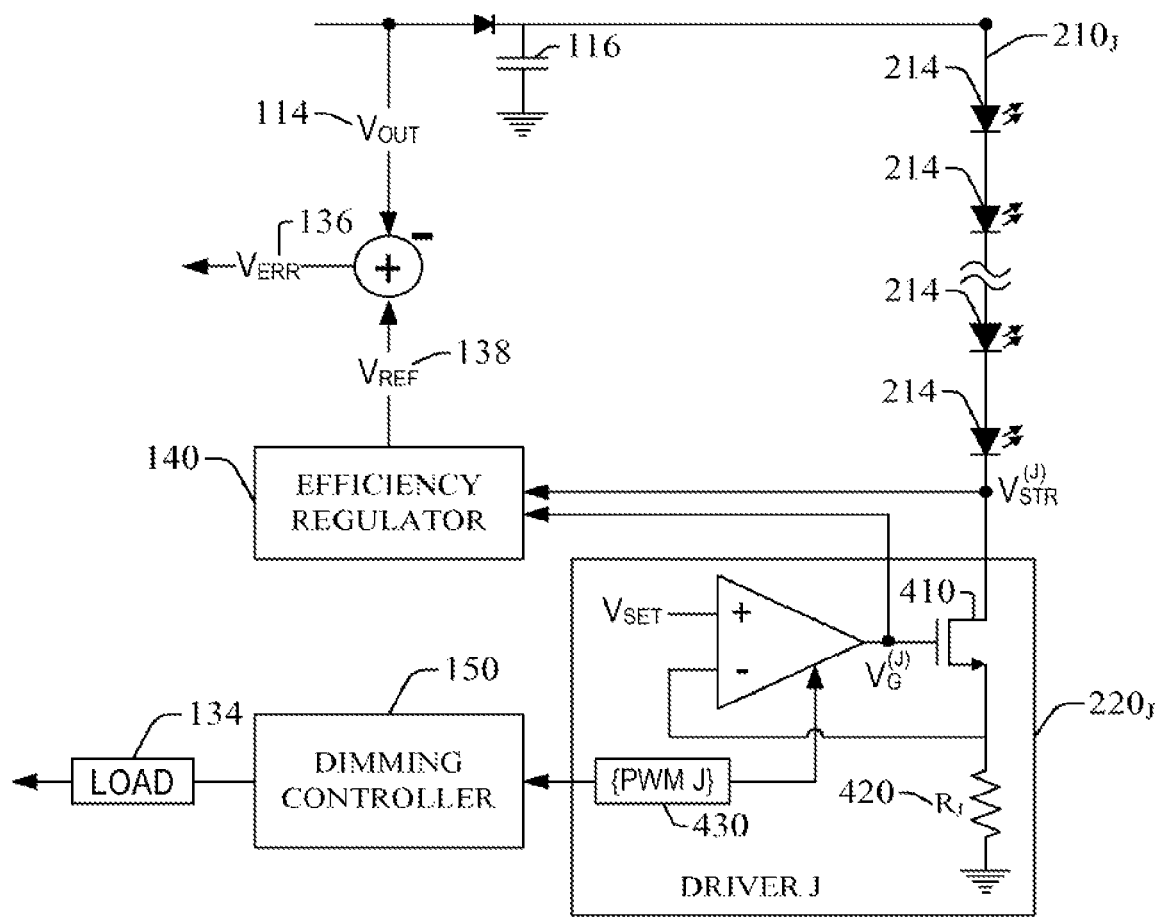
FIG. 4 presents a block diagram of an example embodiment of a driver for a string of LEDs in the example backlighting system illustrated in FIG. 2 in accordance with aspects described herein.

Efficiency regulator 140 can exploit topology of LEDs in backlight circuitry 120 to determine $V_{ref}$ 138. In one or more embodiments, such as example embodiment 200, efficiency regulator 140 can monitor voltage of one or more strings $210_1$-$210_N$ and configure the reference voltage $V_{ref}$ 138 to a value that is low and when applied to compensate $V_{out}$, the compensated value of $V_{out}$ 114 maintains voltages of the strings $210_1$-$210_N$ above a minimum voltage that ensures operation constant current-mode of respective constant current driver circuits $220_1$-$220_N$. As illustrated in FIG. 4, which presents an example embodiment of driver $220_J$ ($1 \leq J \leq N$) for string $210_J$, efficiency regulator 140 can probe string voltage $V_{str}^{(J)}$ or gate voltage $V_G^{(J)}$ of the transistor 410 to establish if driver $220_J$ operates in accordance with manufacturer specification for forward bias voltage $V_{FB} = V_{out} - V_{str}^{(J)}$ of string of LEDs. In an aspect of the subject innovation, dimming controller 150 turns on and off driver $220_J$ in accordance with a PWM waveform J 430, which can be a phase-shifted waveform (see, e.g., FIG. 3). It should be appreciated that $V_{str}^{(J)}$ is the drain voltage of transistor 410, which in the series connection of LEDs in string $210_J$ equals the sum of the forward bias voltage of each LED in string $210_J$. It should be appreciated that due to process and temperature variation, the forward voltage of each string is different; thus, $V_{str}^{(J)}$ is different for each string. Various detailed aspects of operation and related advantages of efficiency regulator 140 are disclosed in U.S. patent application Ser. No. 11/652,736 to instant assignee and entitled "System and Method for Controlling a Multi-String Light Emitting Diode Backlighting System, for an Electronic Display" and filed on Jan. 12, 2007; the entirety of the disclosure of the above-referenced patent application is incorporated herein by reference.

Figure 5:
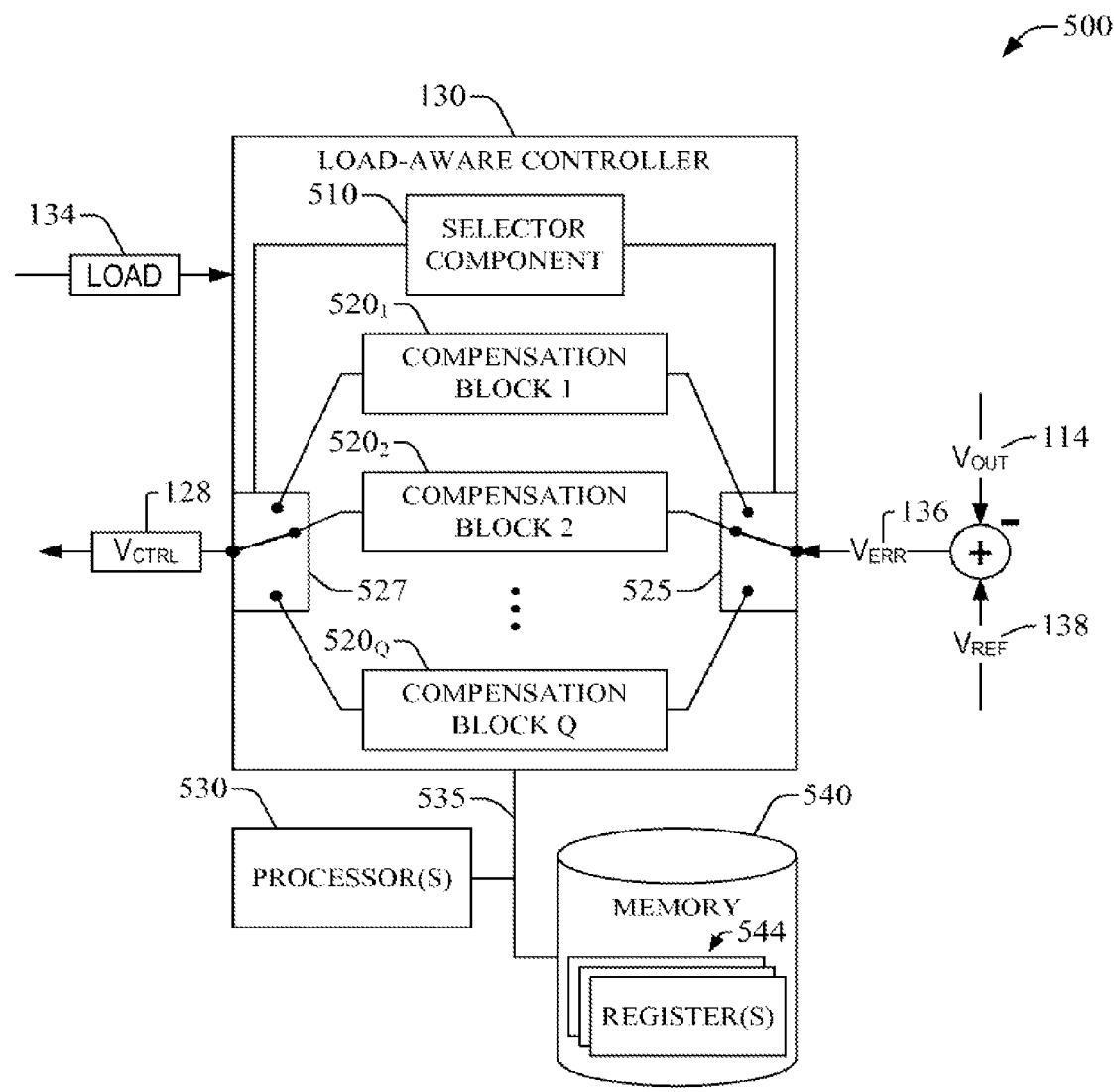
FIG. 5 is a block diagram of an example embodiment of a load-aware controller that operates in accordance with various aspects described herein and thus enables and exploits one or more aspects described in the subject disclosure.

FIG. 5 is a block, diagram of an example embodiment of a load-aware controller 130 that operates in accordance with various aspects described herein and thus enables and exploits one or more aspects described in the subject disclosure. Load-aware controller 130 includes a set of Q compensation blocks $520_Q$ with Q a natural number greater than or equal to unity. The compensation blocks are deployed (e.g., configured or installed, and tested to be operational) in a parallel configuration, with a single compensation block (e.g., $520_2$) closing the compensation feedback loop, while the remaining Q–1 compensation blocks are disconnected from the compensation feedback loop. In the illustrated example embodiment 500, compensation block $520_2$ is connected; such connection is an example connection for illustration purposes; other connections to any of the compensation blocks $520_1$-$520_Q$ are possible based on received load metric 134.

Figure 6:
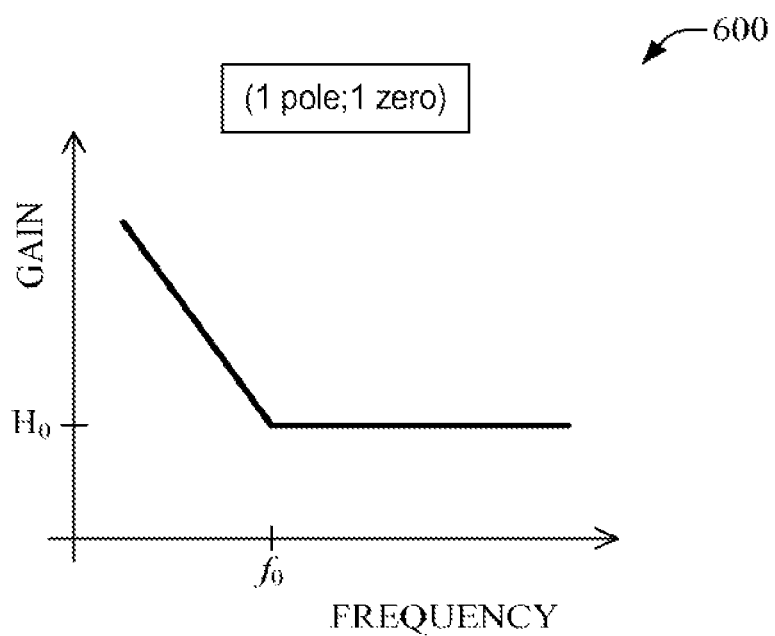
FIG. 6 displays a sketch of an example spectral gain that can be exploited in a digital implementation of one or more compensation blocks in a compensation feedback loop, or circuit, in accordance with aspects of the subject disclosure.

The set of compensation blocks $520_1$-$520_Q$ can include any combination of analog-implemented compensation blocks and digital-implemented compensation blocks; e.g., T compensation blocks can be analog and Q–T can be digital, with $0 \leq T \leq Q$. In a digital implementation of a compensation block that is disconnected, the input signal $V_{err}$ 136, subsequent to analog-to-digital (AD) conversion, can be forced to adopt a value of zero to maintain the state of the compensation block, and thus the compensation feedback loop, for the corresponding load 134. Processor(s) 530 can implement the AD conversion and digital-to-analog (DA) conversion that can be necessary to sample input signal $V_{err}$ 136 and to provide an analog output control signal value $V_{ctrl}$ 128. FIG. 6 displays a sketch of an example spectral gain 600 that can be exploited for digital implementation at least one of compensation blocks $520_1$-$520_Q$. The example spectral gain 600 represents a (1 pole, 1 zero) gain. It should be appreciated that other combination of r poles and S zeroes, with R and S natural numbers greater than or equal to unity can be employed to implement a compensation block (e.g., $520_2$). Spectral gain response for one or more compensation blocks $520_1$-$520_Q$ can be retained in memory 540 as part of register(s) 544. For specific spectral gain models, such as 600, a set of parameters that define frequency $f_0$, gain slope at frequencies below $f_0$, and saturation gain $H_0$ can be retained in at least one of register(s) 544. Digitally implemented compensation blocks can be added to the set of compensation blocks $520_1$-$520_Q$ in response to previously unrecorded changes in load metric 134; for example, if forward voltage specifications of one or more LEDs in one or more strings change as a result of LED degradation or changes in operational environment (e.g., temperature in region(s) of an electronic display (not shown) that contains backlight circuitry 120, a new load metric 134 can be established. If the new load is sufficiently different (e.g., within a predetermined, configurable tolerance) from a recorded load metric value, processors) 530 can establish a new set of parameters for an (R pole, S zero) filter, or a new spectral gain, for a new filter, record in registers 544 the new set of parameters or the new spectral gain and implement a new compensation block (e.g., $520_{Q+1}$) based, at least in part on the newly recorded magnitudes.

In an analog implementation of a compensation block that is disconnected, an input pin can remain in open circuit. In an embodiment, the compensation block in the analog implementation can be embodied in a resistor-inductor-capacitor (RLC) circuit, which can retain a capacity for a specific load subsequent to disconnection in view of changes in load.

Based on received load 134, selector component 510 can connect one of the compensation blocks $520_1$-$520_Q$ to input signal $V_{err}$ 136 via a switch component 525, and to an output connector (a system bus, a wire line, a trace, a wireless interface, etc.) via switch 527. Thus, the output of the connected compensation, block (e.g., $520_2$) provides the output signal $V_{ctrl}$ 128 of load-aware controller 130. In addition, based on the received load 134 or a change thereof, selector component 510 can disconnect a first compensation block (e.g., $520_2$) currently connected and connect a second compensation (e.g., $520_1$) block that was disconnected at a time of, or prior to, reception of the load 134; thus, the first compensation block becomes deactivated, whereas the second compensation block becomes active. In an aspect, selector component 510 can energize, or enable, at least one pin in switch 525 to implement a connection of input signal $V_{err}$ 136 and at least one pin in switch 527 to implement connection of a compensation block (e.g., $520_2$). In another aspect, selector component 510 can de-energize, or disable, at least one pin in switch 527 to disconnect a compensation block (e.g., $520_2$) and at least one pin in switch 525 to disconnect input signal $V_{err}$ 136 from the compensation block (e.g., $520_2$) that is disconnected.

It is noted that the number of compensation blocks and the switching (e.g., the connection and disconnection of compensation block(s)) effected by selector component 510 is designed and implemented in a manner such that noise introduced in backlighting system 100, or circuitry therein, is smaller than noise associated with variation of load conditions associated with PWM dimming. In an aspect, in certain embodiments, load-aware controller 130 can include an integrity component (not shown) that monitors switching noise, e.g., through various measurements, and automatically or autonomously corrects a switching frequency to ensure adequate noise level (e.g., below a predetermined threshold) due to the switching effected by selector component 510.

In certain embodiments in which backlighting system 100 includes LEDs 214 that have matched or substantially matched current ratings and forward voltage ratings, load-aware controller 130 can be implemented with two compensation blocks, e.g., Q=2, since in equilibrium the backlight circuitry 120 can fluctuate amongst two values of load: $L_1 = I_{str} \times \text{floor}(DN)$ and $L_2 = I_{str} \times \text{ceil}(DN)$, where $I_{str}$ is the matched current; loads $L_1$ and $L_2$ are measured in units of current. A load assessment component (not shown) within dimming controller 150 can determine $L_1$ and $L_2$ and supply such load signal value, or load metrics, to load aware controller 130 as part of load 134.

In addition, or in the alternative, in one or more embodiments in which Q>2, selector component 510 can assess a change in load conditions based on received load 134; the assessment can be based on comparison of a first load metric and a second load metric. Based on the assessment outcome, selector component 510 can identify a compensation block in the set of compensation blocks $520_1$-$520_Q$, to connect as part of the compensation feedback loop in response to the outcome of the assessment. It is noted that a dedicated assessment component (not shown) can be included in load-aware controller 130 to perform the foregoing assessment. The various load conditions and associated load metric can originate from LEDs in disparate strings not being rating-matched, luminosity or brightness changes throughout operation of an electronic display that include backlight circuitry 120 (display enters power-save mode, end-user adjusts brightness to a new value, etc.), temperature changes, such as those that may occur in the electronic display in operation at non-uniform, temperatures, or the like. In the one or more embodiments in which a plurality of strings of LEDs have different string current, dimming controller 150 can retrieve, receive, or otherwise acquire, a set of currents $\{I_{str}^{(J)}\}_{J=1 \ldots N}$ for a set of respective strings of LEDs $210_1$-$210_N$, and determine a group of two or more load signals, or load metrics, in equilibrium during phase-shifted PWM dimming. In an aspect, the load assessment component (not shown) in dimming controller 150 can monitor current in one or more drivers $220_K$ and determine the group of load signal values in the equilibrium state. The group of load metrics is supplied as part of load 134 to load-aware controller 130, which can switrch through a group of compensation blocks $520_1$-$520_G$, wherein G (a natural number) is the cardinality of the group of two or more load signal values in the equilibrium state.

To implement the various features or aspects described supra, load-aware controller 130 is functionally coupled to proeessor(s) 530. In addition, input/output (I/O) components) (not shown) can enable configuration of various registers and other values utilized in operation of load-aware controller 130. In an aspect, processor(s) 530 can be configured to provide or can provide, at least in part, the described functionality of load-aware controller 130 or one or more functional elements (e.g., components, block) therein. In an aspect, to provide such functionality, processor(s) 530 can exploit bus 535 to exchange data or any other information amongst functional elements (e.g., component(s), block(s) within load-aware controller 130 and memory 540 or elements therein, such as register(s) 544. Bus 535 can be embodied in at least one of a memory bus, a system bus, an address bus, a message bus, or any other conduit, protocol, or mechanism for data or information exchange among components that execute a process or are part of execution of a process. The exchanged information can include at least one of code instructions, code structure(s), data structures, or the like.

Processor(s) 530 also can execute code instructions (not shown) stored in memory 540 to implement or provide at least part of the described functionality of load-aware controller. Such code instructions can include program modules or software or firmware applications that implement specific tasks which can be accomplished through one or more of the methods described in the subject specification and that are associated, at least in part, with functionality or operation of example backlighting system 100. In one or more alternative or additional embodiment(s), processor(s) 530 can be distributed amongst one or more functional elements (components, blocks, etc.) of load-aware controller 130. Further, in some embodiments, digitally implemented compensation blocks in the set of compensation blocks $520_1$-$520_Q$ can be implemented as software or firmware and can reside within memory 540 as one or more sets of code instructions that, when executed by processor(s) 530, implement such functional elements (components, blocks, etc.) and described functionality thereof.

In one or more embodiments, load-aware controller 130 can be either a general microcomputer or a special purpose microcomputer. Load-aware controller 130 and other component(s) or functional element(s) can be implemented on a single integrated circuit (IC) chip or on multiple IC chips. Such single IC chip also can include other functional elements such as dimming controller 150. In addition, through provision of code instructions to memory 540, load-aware controller 130 can be programmable. In the alternative, load-aware controller 130 can be non-programmable and operate in accordance with aspects herein as established at manufacturing time. In embodiments in which load-aware controller 130 is non-programmable, a tradeoff between performance of compensation feedback loop and complexity of the load-aware controller 130 can be achieved in which less complexity and related costs outweighs possible increased variations in output voltage 114 as a result of new load conditions becoming present in backlight circuitry 120. In view of the foregoing it is readily appreciated that load-aware controller 130 can be implemented in hardware, software, or firmware.

Figure 7:
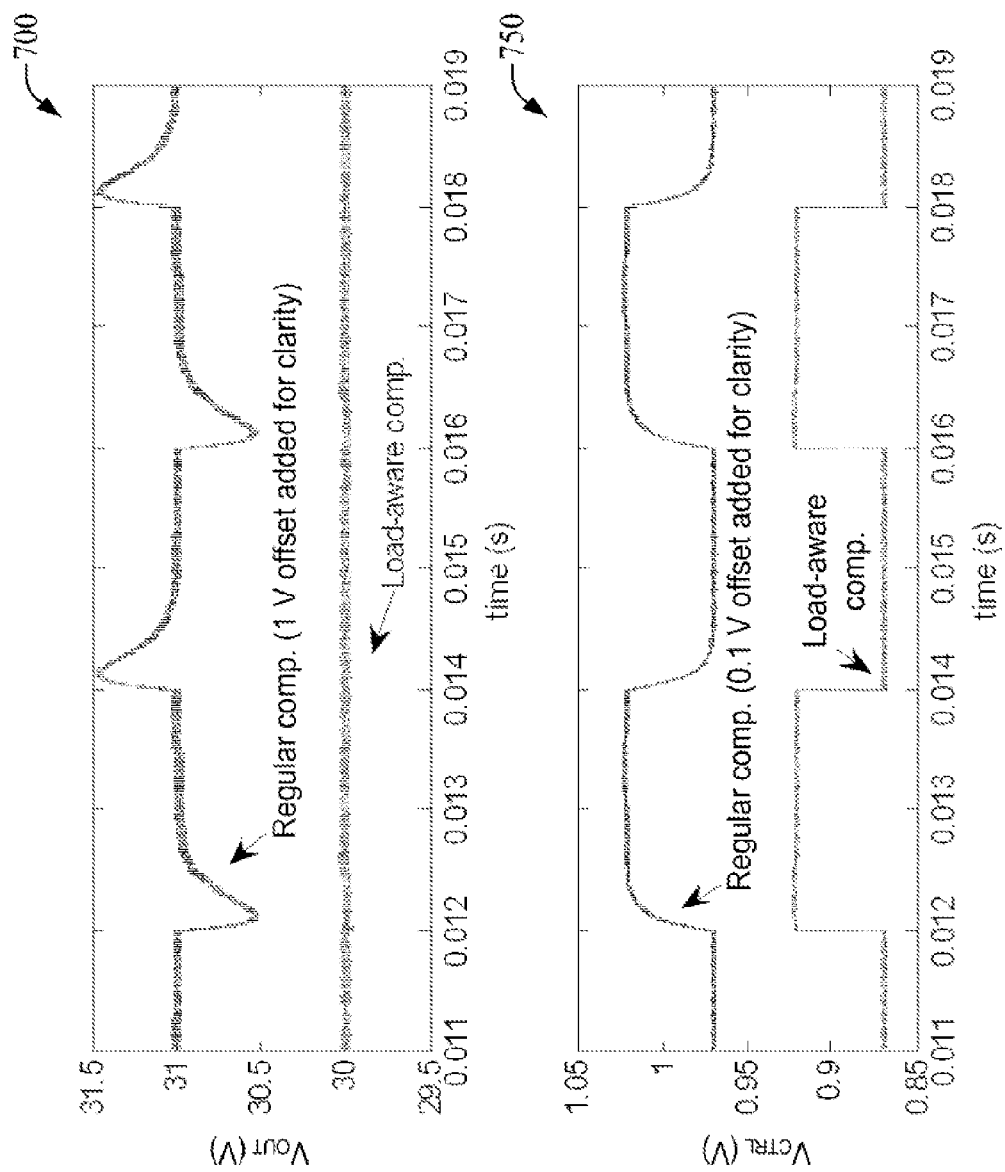
FIG. 7 presents results of simulations of power management with conventional compensation and load-aware compensation in accordance with aspects described herein.

FIG. 7 presents results of simulations of power management with conventional compensation and load-aware compensation in accordance with aspects described herein. In particular, FIG. 7 displays charts that illustrate results of simulations of $V_{out}$ 114, represented by a voltage $V_{out}$ in chart 700; and control signal $V_{ctrl}$ 128, represented by a voltage $V_{ctrl}$ in chart 750, as a function of time. In the simulations, load switches between 140 mA and 160 mA, as a result of phase-shifted PWM. Chart 700 displays time dependence of $V_{out}$ 114 if regulated conventionally (top trace; regular compensation) and if regulated in accordance with aspects of the subject disclosure (lower trace). Since both curves converge to the same or substantially the same values, the curve corresponding to simulation of conventional compensation is shifted upwards by a specific offset voltage value shown in the chart for the sake of clarity. If conventionally regulated, $V_{out}$ 114 presents substantially larger variations in response to load changes than in load aware compensation scenarios. Such variation in conventional power management systems is unavoidable because the output voltage varies in response to load transient—reflected in $V_{ctrl}$ transient (chart 750)—associated with load variation. In chart 750, control signal displays similar trend: In conventional compensation, $V_{ctrl}$ switches between substantially two output values after a transient interval, whereas for load-aware compensation, $V_{ctrl}$ switches instantaneously or nearly instantaneously (e.g., within numerical resolution of simulation) amongst substantially two values. For load-aware compensation, a two-block (Q=2) load-aware controller 130 is simulated. Since both curves converge to the same or substantially the same values, the curve corresponding to simulation of $V_{ctrl}$ with conventional compensation (or regular compensation) is shifted upwards by a specific offset voltage value shown in the chart for the sake of clarity.

Simulation results presented in charts 700 and 750 thus convey that in load-aware compensation, $V_{ref}$ 138 can be set to lower values than in conventional compensation in view of reduced variation in $V_{out}$ 114 in response to load variation. Thus, load-aware compensation as described herein is more energy efficient.

When compared to conventional power management systems in LED-based backlighting systems, at least one advantage of the load-aware controller and related compensation feedback circuit described herein is that power efficiency of a LED-based backlighting system (e.g., 100) can be implemented through PWM dimming with reduced variation of output voltage applied to backlight circuitry in the LED-based backlighting system in response presence of time-dependent load condition(s) of the backlight circuitry. Reduced variation of the output voltage avoids introducing audible noises arising from electronic components (e.g., capacitor 116) of the backlighting system 100. It should be appreciated that such avoidance does not entail pushing the frequency of the PWM dimming waveform to an inaudible frequency, which typically limits the PWM dimming efficiency in view of a lower bound(s) on response of drivers, or current sinks, in the backlight circuitry.

Figure 8:
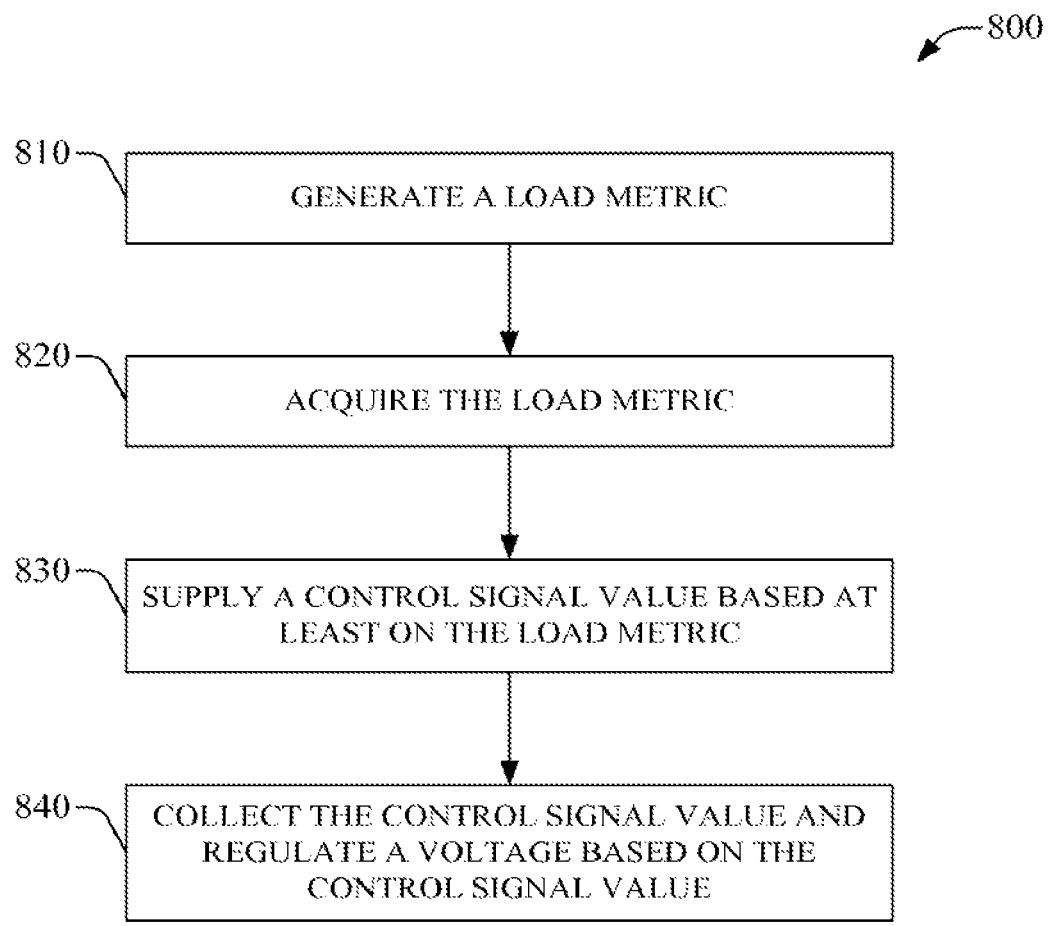
FIG. 8 is a flowchart of an example method for compensating a power source of an LED-based backlighting illumination system according to aspects described herein.
Figure 9:
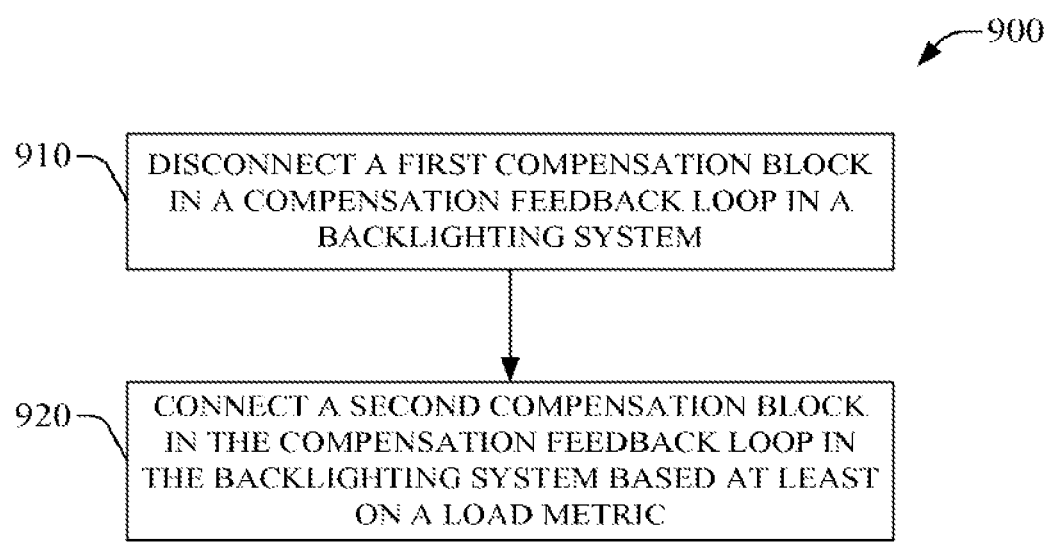
FIGS. 9-10 display a flowchart of an example method for supplying a control signal that can be employed to compensate a power source of an LED-based backlighting illumination, system according to aspects of the subject disclosure.
Figure 10:
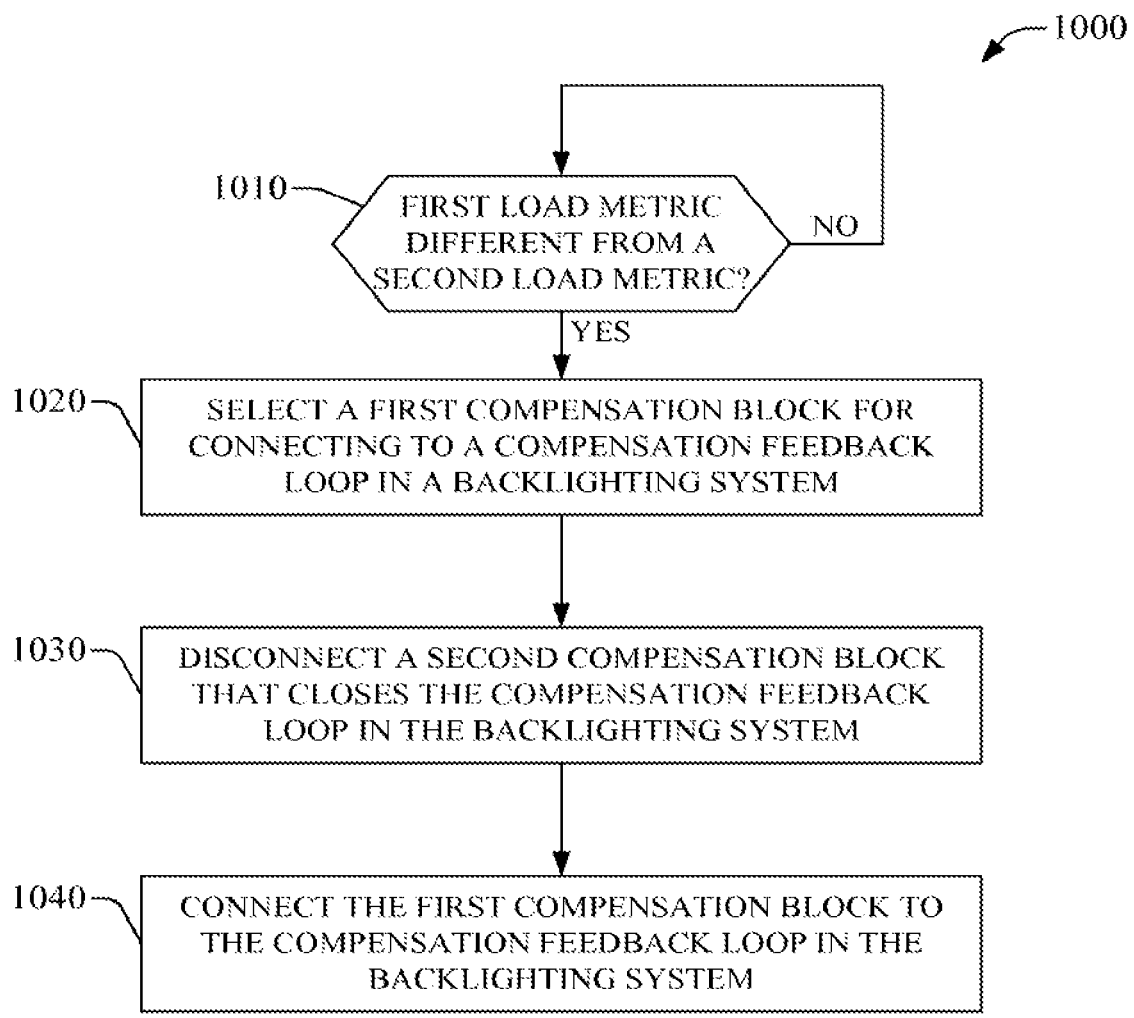

In view of the example system(s) described above, example methods that can be implemented in accordance with the disclosed subject matter can be better appreciated with reference to flowchart in FIGS. 8-10. For purposes of simplicity of explanation, example methods disclosed herein are presented and described as a series of acts; however, it is to be understood and appreciated that the disclosed subject matter is not limited by the order of acts, as some acts may occur in different orders and/or concurrently with other acts from that shown and described herein. Eor example, one or more example methods disclosed herein can alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages described herein.

Method(s) disclosed throughout the subject specification and annexed drawings are capable of being stored on an article of manufacture to facilitate transporting and transferring such method(s) to computers or chipsets, e.g., integrated semiconductor-based circuits, with processing capability (ies) for execution, and thus implementation, by a processor, or for storage in a memory. In an aspect, one or more processors that enact method(s) described herein can be employed to execute code instructions retained in a memory, or any computer- or machine-readable storage medium, to implement method(s) described herein; the code instructions, when executed by the one or more processor implement or carry out the various acts in the method(s) described herein. The code instructions provide a computer- or machine-executable framework to enact the method(s) described herein.

FIG. 8 is a flowchart of an example method 800 for compensating a power source of an LED-based backlight illumination system according to aspects described herein. In an aspect the subject example method can be enacted by a load-aware controller (e.g., 130) that operates as described hereinabove. At act 810, a load metric is generated. In an aspect, a dimming controller generates the load metric based at least on a PWM duty cycle value D and a number N of strings of LEDs ($210_1$-$210_N$) in a set of LEDs that are part of backlight circuitry (e.g., 120) in a display. At act 820, a load metric is acquired. The acquiring can include (i) configuring the dimming controller to deliver the load metric based on at least one of a load change, a change in a dimming configuration (e.g. a PWM dimming profile), a schedule, a predetermined period, or the like; and (ii) receiving the load metric from the dimming controller according to a specific configuration. In one or more embodiments, the load metric can be generated by circuitry or a device other than the dimming controller; the circuitry or the device can be configured as part of the acquiring, as described supra. At act 830, a control signal value is supplied based at least on the load metric, as described supra. At act 840, the control signal value is collected and a voltage is regulated based on the control signal value; the voltage can be an output voltage applied to the backlight circuitry.

Supplying the control signal can be implemented in various modalities, as illustrated in FIGS. 9 and 10, which display, respectively, flowcharts of example methods 900 and 1000 for supplying a control signal value that can be employed to compensate a power source of an LED-based backlighting illumination system according to aspects of the subject disclosure. With respect to example method 900, at act 910, a first compensation block in a compensation feedback loop in a backlighting system is disconnected. As described supra, a selector component (e.g., 510) that is part of the load-aware controller (e.g., 130) that enacts example method 800 can implement the subject act. Disconnecting the first compensation block can include forcing an offset, or error, signal to zero to maintain the state of the compensation feedback loop for utilization in instances in which a load metric leads to connecting the first compensation block subsequent to the disconnecting it through act 910. At act 920, a second compensation block in the compensation feedback loop in the backlighting system is connected based at least on a load metric. The selector component (e.g., 510) can implement the subject act.

With respect to example method 1000, at act 1010, it is determined if a first load metric is different from a second load metric. The first load metric can be acquired according to act 810, whereas the second load metric can be a historical value or set of historical values (e.g., a time sequence) previously acquired. If the determining indicates the first load metric and the second load metrics are different, flow is directed to act 1020; conversely, if the determining establishes that the first load metric and the second load metric are not different, then act 1010 is re-enacted. Act 1010 can be re-enacted after new load metric(s) are acquired. At act 1020, a first compensation block for connecting to a compensation feedback loop in a backlighting system (e.g., 100) is selected. In an aspect, the selecting can be based on an relationship (e.g., a one-to-one association) amongst the first compensation block and the first load metric; for example, during previous operation of backlighting system, the first compensation block was selected for closing the compensation feedback loop for a load metric value equal or substantially equal (e.g., within a predetermined numerical tolerance) to the first load metric. At act 1030, a second compensation block that closes the compensation feedback loop in the backlighting system is disconnected. Disconnecting the second compensation block can include forcing an offset, or error, signal to zero to maintain the state of the compensation feedback loop for utilization in instances in which a load metric leads to connecting the second compensation block subsequent to the disconnecting it through act 910. At act 1040, the first compensation block is connected to the compensation feedback loop in the backlighting system. The connecting can include energizing a switch or switch component for outputting a control signal (e.g., $V_{ctrl}$ 128) to a power source, as described supra.

As employed herein, the term "relative to" means that a value A established relative to a value B signifies that A is a function of the value B. The functional relationship between A and B can be established mathematically or by reference to a theoretical or empirical relationship. As used herein, the term "coupled" means directly or indirectly connected in series or in parallel by wires, traces or other connecting elements, including wireless interfaces. Coupled elements may receive signals from each other.

In the subject specification, terms such as "store," "data store," data storage," and substantially any term(s) that convey other information storage component(s) relevant to operation and functionality of a functional element or component described herein, refer to "memory components," or entities embodied in a "memory" or components comprising the memory. The memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of further illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to or configured to perform one or more of the steps or acts described above.

Further, the steps or acts of a method or algorithm described in connection with the aspects disclosed herein may be embodied directly in hardware; in a software module executed by a processor, or in a combination of the two, such as in a firmware module. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in display equipment. In the alternative, the processor and the storage medium may reside as discrete components, e.g., chipsets, in display equipment. Additionally, in some aspects, the steps or acts of a method or algorithm may reside as one or any combination or set of codes or instructions on a machine-readable medium or computer-readable medium, which may be incorporated into a computer program product.

In one or more aspects, the functions described may be implemented in hardware, software, firmware, or any combination, thereof. If implemented in software, the functions may be stored or transmitted as one or more instructions or code on a computer-readable medium or machine-readable medium. Computer-readable media machine-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial, cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above also are included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. In addition, although elements of the described aspects and/or embodiments may be described or claimed in the singular, the plural is contemplated unless limitation to the singular is explicitly stated. Moreover, all or a portion of any aspect and/or embodiment may be utilized with all or a portion of any other aspect and/or embodiment, unless stated otherwise. Furthermore, to the extent that the terms "includes," "has," "possesses," and the like are used in the detailed description, claims, appendices and drawings such terms are intended to be inclusive in a manner similar to the term, "comprising" as "comprising" is interpreted when employed as a transitional word in a claim.

What is claimed is:

1. An illumination system, comprising:
    illumination circuitry comprising a plurality of strings of one or more LEDs;
    an efficiency regulator configured to provide an offset value based on one or more string voltages of one or more strings of the plurality of strings and a voltage supplied to the illumination circuitry;
    an error circuit configured to provide an error value based on a difference between the offset value and the voltage supplied to the illumination circuitry; and
    a controller configured to provide a control signal to power supply circuitry that supplies the voltage to the illumination circuitry, wherein the controller is configured to receive a load metric of the illumination circuitry and the error value and provide the control signal based on the load metric and the error value.

2. The illumination system of claim 1, wherein the illumination system comprises the power supply circuitry, and the power supply circuitry is configured to regulate the voltage based on the control signal.

3. The illumination system of claim 2, wherein the power supply circuitry comprises a DC-DC converter.

4. The illumination system of claim 1, wherein the efficiency regulator is configured to monitor the one or more string voltages, determine a reference voltage based on the one or more string voltages, and generate the offset value as a difference between the reference voltage and the voltage supplied to the illumination circuitry.

5. The illumination system of claim 1, wherein the controller comprises a plurality of compensation blocks and a selector component configured to switch from a first compensation block to a second compensation block based on the load such that the second compensation block receives the offset value and provides the control signal to the power supply circuitry.

6. The illumination system of claim 1, wherein the controller is configured to receive the load metric of the load from a dimming controller that is configured to determine the load metric based at least in part by a pulse-width modulation (PWM) dimming profile of power applied to the illumination circuitry.

7. The illumination system of claim 6, wherein the dimming controller is configured to apply the PWM dimming profile of power through application of phase-shifted PWM power to the plurality of strings of one or more LEDs.

8. The illumination system of claim 6, wherein the dimming controller is configured to determine the load metric based on a product of a duty cycle of the PWM dimming profile and a number of strings of one or more LEDs in the plurality of strings of one or more LEDs.

9. The illumination system of claim 1, wherein the controller comprises a plurality of compensation blocks and the compensation blocks are implemented as filters, each filter having a gain response different from other gain responses of other filters; and wherein at least one compensation block in the plurality of compensation blocks is digital and implemented as a digital filter with at least one pole.

10. The illumination system of claim 9, wherein at least one memory register stores at least one control signal value for the at least one compensation block that is digital.

11. The illumination system of claim 9, wherein the digital filter is a one-zero, one-pole filter.

12. The illumination system of claim 1, wherein the controller comprises a plurality of compensation blocks and at least one compensation block in the plurality of compensation blocks is an analog element that includes a resistor, a capacitor, and an inductor.

13. The illumination system of claim 1, wherein the controller comprises two compensation blocks and a selector component, and the load metric of the load is based on two values in an equilibrium state, and wherein the selector component is configured to connect the first of the two compensation blocks to a compensation feedback circuit for the first of the two values of the load metric and the second of the two compensation blocks for the second of the two values of the load metric.

14. The illumination system of claim 1, wherein a particular string of the plurality of strings comprises one or more red LEDs, one or more blue LEDs, or one or more green LEDs.

15. A method, comprising:
    acquiring a load metric of a load of illumination circuitry, wherein the illumination circuitry comprises a plurality of strings of one or more LEDs;
    acquiring an error value from an error circuit that generates the error value based on a difference between an offset value from an efficiency regulator coupled to the illumination circuitry and a voltage value of a voltage supplied to the illumination circuitry, wherein the efficiency regulator is configured to provide the offset value based on one or more string voltages of one or more strings of the plurality of strings and the voltage supplied to the illumination circuitry; and
    supplying a control signal value based at least on the load metric and the offset value to power supply circuitry that receives the control signal value and regulates the voltage supplied to the illumination circuitry based on the control signal value.

16. The method of claim 15, wherein supplying a control signal value comprises:
    disconnecting a first compensation block in a compensation feedback circuit in an illumination system comprising the illumination circuitry; and
    connecting a second compensation block to the compensation feedback circuit;
    wherein the first compensation block has a first filter gain response, and
    wherein the second compensation block has a second filter gain response different from the first filter gain response.

17. The method of claim 15, wherein supplying a control signal value comprises:
    comparing a first load metric with a second load metric; and
    if the first load metric is different from the second load metric:
        selecting a first compensation block for connecting to a compensation feedback loop in an illumination system that includes the illumination circuitry;
        disconnecting a second compensation block that closes the compensation feedback circuit in the backlighting system; and
        connecting the first compensation block to the compensation feedback circuit in the illumination system.

18. The method of claim 15, wherein acquiring a load metric comprises:
    configuring circuitry to deliver the load metric based at least on at least one of a load change, a change on a pulse-width modulation dimming profile, a schedule, or a predetermined period; and receiving the load metric according at least in part to a configuration of the circuitry.

19. The method of claim 15, further comprising:

generating the load metric, wherein the load metric is based at least on a pulse-width modulation (PMW) dimming profile; and supplying the load metric.

\* \* \* \* \*

UNITED STATES PATENT AND TRADEMARK OFFICE
CERTIFICATE OF CORRECTION

PATENT NO.      : 9,064,461 B2
APPLICATION NO. : 14/076899
DATED           : June 23, 2015
INVENTOR(S)     : Yang et al.

It is certified that error appears in the above-identified patent and that said Letters Patent is hereby corrected as shown below:

On the title page item [57]

Line 5 delete "bad" and insert --load--, therefor.

Line 7 after "connected" insert --to--.

Line 8 delete "compensation," and insert --compensation--, therefor.

Line 10 delete "pulse-modulation" and insert --pulse-width modulation--, therefor.

In the specification

Column 1 Line 11 delete "conditions)" and insert --condition(s)--, therefor.

Column 1 Line 50 delete "that," and insert --that--, therefor.

Column 2 Line 3 delete "critical," and insert --critical--, therefor.

Column 2 Line 42 delete "the a" and insert --the--, therefor.

Column 2 Line 63 delete "system," and insert --system--, therefor.

Column 3 Line 21-22 delete "illumination," and insert --illumination--, therefor.

Column 4 Line 12 delete "than," and insert --than--, therefor.

Column 4 Line 56 delete "Such," and insert --Such--, therefor.

Column 5 Line 27 delete "circuitry" and insert --circuitry.--, therefor.

Column 6 Line 67 delete "that," and insert --that--, therefor.

Column 7 Line 41 delete "System," and insert --System--, therefor.

Column 7 Line 45 delete "block," and insert --block--, therefor.

Column 8 Line 12 delete "r" and insert --R--, therefor.

Column 8 Line 30 delete "processors)" and insert --processor(s)--, therefor.

Column 8 Line 32 delete "gain," and insert --gain--, therefor.

Column 8 Line 34 delete "based," and insert --based--, therefor.

Column 8 Line 47 delete "compensation," and insert --compensation--, therefor.

Signed and Sealed this
Twelfth Day of January, 2016

Michelle K. Lee
*Director of the United States Patent and Trademark Office*

CERTIFICATE OF CORRECTION (continued)
U.S. Pat. No. 9,064,461 B2

In the specification

Column 8 Line 48 delete "ofload" and insert --of load--, therefor.

Column 9 Line 40 delete "non-uniform," and insert --non-uniform--, therefor.

Column 9 Line 44 delete "$\{I_{str}^{(J)}\}J\text{-}1 \ldots N$" and insert --"$\{I_{str}^{(J)}\}J=1 \ldots N$"--, therefor Column 9 Line 52 delete "swritch" and insert --switch--, therefor.

Column 9 Line 58 delete "proeessor(s)" and insert --processor(s)--, therefor.

Column 9 Line 58 delete "components)" and insert --component(s)--, therefor.

Column 9 Line 67 delete "block(s)" and insert --block(s))--, therefor.

Column 11 Line 47 delete "Eor" and insert --For--, therefor.

Column 13 Line 40 After "erasable" insert --programmable--.

Column 14 Line 7 delete "processor," and insert --processor;--, therefor.

Column 14 Line 27-28 delete "combination," and insert --combination--, therefor.

Column 14 Line 45 delete "coaxial," and insert --coaxial--, therefor.

Column 15 Line 3 delete "term," and insert --term--, therefor.

In the claims

Column 17 Line 5 claim 19, delete "(PMW)" and insert --(PWM)--, therefor.